United States Patent

Zaugg

[11] 3,741,989
[45] June 26, 1973

[54] LACTONIC ACETALS
[75] Inventor: Harold Elmer Zaugg, Lake Forest, Ill.
[73] Assignee: Abbott Laboratories, Chicago, Ill.
[22] Filed: Oct. 27, 1970
[21] Appl. No.: 84,464

[52] U.S. Cl. ...... 260/343.6, 260/239 E, 260/558 R, 71/88
[51] Int. Cl. ............ C07d 5/06
[58] Field of Search ............... 260/343.6

[56] References Cited
UNITED STATES PATENTS
2,659,733   11/1953   Folkers ............ 260/343.6

Primary Examiner—Donald G. Daus
Assistant Examiner—Anne Marie T. Tighe
Attorney—Robert L. Niblack

[57] ABSTRACT

Covers lactonic acetals of the formula

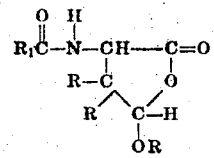

where R is a lower alkyl group and $R_1$ is an aryl group. Also covers their method of employment as herbicides.

2 Claims, No Drawings

LACTONIC ACETALS

BACKGROUND OF THE INVENTION

The use of herbicides to control and inhibit undesirable weed growth is well known and of wide-spread usage in the agricultural, industrial and domestic fields. Roadsides, embankments and other earth surfaces are often subjected to treatment with toxic chemicals, organic and inorganic. These numerous compounds with a wide-spread variance in functionality are effective in inhibiting or destroying the growth of undesirable vegetation.

Obnoxious plants or weeds which interfere with human operations may be broadly classified into two groups. These two groups are known generally as broad leaf plants and grasses. Herbicides have been broadly classified with regard to their activity in combatting these pervasive-type plants. If the herbicide is effective in destroying or inhibiting the growth of both broad-leaf plants and grasses, it is considered to be a non-selective-type herbicide. Again, those which have only limited activity on certain type plants are known as selective herbicides. However, a non-selective herbicide, while giving good control initially, may have the disadvantage of giving only a short term control. Frequently, massive dosages of herbicidally active chemicals are required for a long-term kill and such use therefore, becomes economically impractical.

Numerous other disadvantages are inherent in many types of herbicides. For example, many are susceptible to direct bacterial decomposition. Other herbicides are leached from the soil by water and rendered ineffective. Because of solubility problems, some herbicides have the disadvantage of being very difficult to apply. In fact, some of the very effective herbicides are insoluble in either hydrocarbon or aqueous-type solvents and many are incapable of even being emulsified satisfactorily. Also toxicity problems are inherent in the use of many well known herbicides. All of these problems make many classes of herbicides either dangerous, or ineffective, or uneconomical to use.

The purpose of this invention then is to eliminate all or part of the above inadequacies by providing compositions of matter that are particularly unique in their chemical make-up. The newly invented compositions are less subject to the above described limitations than many previously known herbicides.

Therefore, it becomes an object of the invention to provide new herbicidal compositions.

A further object is to provide herbicidal compositions which will control a wide variety of undesirable vegetation, including members of both the two general classes of broad leaf species and grasses.

A very important object of the invention is to furnish herbicidal compositions which are easy to prepare and also economical to use.

Other objects will appear hereinafter.

DETAILED DESCRIPTION OF THE INVENTION

In accordance with the invention, a new class of herbicides have been synthesized. These lactonic acetals have the following general structural formula:

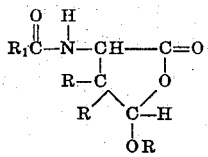

where R is a lower alkyl group and $R_1$ is an aryl group. R usually contains from 1 to 6 carbon atoms and may be linear or a branched chain structure. Thus, R may be methyl, ethyl, n-propyl, isopropyl, n-butyl, t-butyl, heptyl, hexyl, etc. Likewise $R_1$ may be phenyl or a substituted phenyl group. The phenyl group may contain such substituents as halo including chloro and fluoro, hydroxy, nitro, lower alkyl, cyano, etc. Likewise, the phenyl group may be substituted with a plurality of such groups or others.

The new compounds here may be made a number of ways. One excellent method involves starting with an N-trihaloalkyl benzamide, which class of materials is known [Synthesis, 49 (1970)]. The first step in the reaction involves cyclization of the above to yield a 1-benzoyl-2,2-dihaloaziridine. One excellent means of cyclization involves treatment of the benzamide with sodium hydride in dimethylformamide solvent.

The above aziridine class of materials is then reacted with a lower alkyl alcohol, such as methanol, ethanol, isopropyl alcohol, etc., in the presence of a mineral acid such as hydrochloric acid. The alcoholysis of the aziridine produces the corresponding lactonic acetal.

The following examples illustrate preparation of a typical compound of the invention and its efficacy as a herbicide. It is understood, of course, that these examples are merely illustrative and that the invention is not to be limited thereto.

EXAMPLE I

Preparation of α-(1-benzoyl-2,2-dichloro-3-aziridinyl)isobutyraldehyde

To a stirred suspension of 2.9 g. (0.12 mole) of sodium hydride (washed free of mineral oil dispersant using pentane) in dry dimethylformamide (100 ml.) was added a solution of N-(2,2,2-trichloroethyl-1-isobutyral)-benzamide (18.5 g., 0.0575 mole) in dimethylformamide (50 ml.). The addition rate was adjusted to maintain a temperature of 35° and the mixture was then stirred overnight at room temperature. The solution was separated from unreacted sodium hydride by centrifugation. The hydride was washed by centrifugation twice with dimethylformamide and once with benzene. The combined decantates were then concentrated to dryness under reduced pressure at a maximum temperature of 50°. The semi-solid residue was partitioned between water and ether. From the ether layer, after washing, drying and concentrating, was obtained 13.7 g. of an amber oil. All but 2.6 g. of this material dissolved in 250–300 ml. of boiling pentane. This solution was decolorized with charcoal, concentrated to 75–100 ml. and allowed to stand at room temperature overnight in an open conical flask. The residual waxy solid (9 g.) was slurried in pentane and collected at the filter to give the desired product (7.5 g., 45 percent), m.p. 57°–60°, sufficiently pure for further use. Two recrystallizations from pentane gave a pure product: m.p. 64°–65°; ir (CHCl$_3$) 1690 (amide I) and 1720 cm$^{-1}$ (HC=O), no NH; nmr (CDCl$_3$) δ 9.70 (s, 1, HCO), 8.3-7.6 (m, 5, ArH), 3.23 (s, 1, NCH), 1.42 (s, 3, CH$_3$), and 1.37 ppm (s, 3, CH$_3$). Anal. Calcd. for C$_{13}$H$_{13}$Cl$_2$NO$_2$: C, 54.56; H, 4.58; Cl, 24.79; N, 4.90. Found: C, 54.86; H, 5.01; Cl, 24.46; N, 4.49.

The dichloroaziridine is thermally stable. It distilled at 140°–145° (0.5 mm, bath temperature 215°) with only slight decomposition. When refluxed in xylene for 24 hours, it could be recovered quantitatively.

The following describes the above reaction sequence.

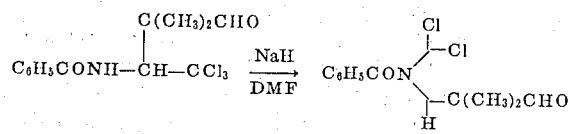

EXAMPLE II

Preparation of 4-hydroxy-4-methoxy-2-benzamido-3,3,-dimethyl butyric acid γ-lactone A solution of the compound of Example I (7.5 g., 0.0262 mole) in dry methanol (75 ml.) was allowed to stand at room temperature for 7 weeks. The mixture became deep yellow and strongly acidic. It was concentrated to dryness under reduced pressure and semisolid residue (7.5 g.) was triturated with ethanol. Colorless solid (2.94 g., 43 percent, m.p. 156°–158°) was collected at the filter and recrystallized from methanol to give pure 4-hydroxy-4-methoxy-2-benzamido-3,3-dimethylbutyric acid γ-lactone: m.p. 158°–159°; ir (CHCl$_3$) 1668 (amide I), 1778 (lactone C=O), 2835 (OCH$_3$), 3370 and 3425 cm$^{-1}$ (NH); nmr (CDCl$_3$) γ8.0–7.3 (m, 5, ArH), 6.77 (d, 1, J=8Hz, N-CH), 5.22 (d, 1, J=8Hz, N-CH), 5.00 (s, 1, OCH), 3.57 (s, 3, OCH$_3$), 1.28 (s, 3, CCH$_3$), and 1.08 ppm (s, 3, CCH$_3$). Anal. Calcd. for C$_{14}$H$_{17}$NO$_4$: C, 63.86; H, 6.51; N, 5.32; O, 24.31. Found: C, 63.68; H, 6.50; N, 5.33; O, 24.44.

The reaction sequence here is as follows.

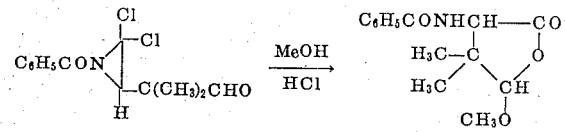

EXAMPLE III

The compound of Example II was then tested for its herbicidal activity.

A water-isopropyl alcohol solution of the compound was prepared and sprayed right after the seeds of the test plants were planted. The pre-emergence treatment dosage was 10 pounds per acre. Approximately 2–3 weeks later, readings were made as to activity of the material. The scale of readings range from 0 to 10, with a 0 rating indicating no activity and a 10 rating indicating complete activity.

The compound here was first tested against smooth crab grass and had a rating of 2 against emergence. That is, 80 percent of the seeds came up. However, 90 percent of the plants that did come up were chlorotic and dead.

The herbicidal composition was then tested against hairy crab grass. Here, it was given a rating of 5. That is, 50 percent of the seeds did not even emerge as plants. Of the 50 percent that did emerge, 90 percent had their growth retarded.

The herbicide was then tested against curly dock and showed a 30 percent activity against emergence (rating of 3). 40 percent of those plants that did emerge were chlorotic and dead.

Lastly, the herbicidal material of Example II was tested against Johnson grass rhizome in another pre-emergence-type of test. No growth of Johnson's grass so treated was noted.

The new compositions here are active against a variety of noxious plants. Good growth control of undesirable vegetation has been accomplished through the use of the herbicides here in treatment amounts ranging from 2 to 600 pounds per acre. The more preferred amounts of herbicide used here range from about 5 to about 50 pounds per acre. The above suggested dosage required for weed control with compositions of the invention will depend, of course, upon the circumstances of each individual situation. One skilled in the art may, using conventional weed control techniques, quickly ascertain the amount that is necessary to be applied in effective dosages.

The preferred mode of application involves spraying solutions of the active ingredients. However, other conventional means of applying the herbicides here may also be used such as dusting, applying pellets, etc.

The herbicidal chemicals here are generally applied in solution form and in one of the following liquid forms: water, oil, oil-in-water emulsions and water-in-oil emulsions. Usually solutions of water and an organic solvent such as an alcohol are employed to solubilize the active ingredients. In most instances, the water component comprises at least 60 percent by weight of the solution. The aqueous or other solutions containing the herbicide may also contain emulsifying agents, surface-active chemicals, dispersing aids, etc.

Oil-containing herbicidal solutions, straight oil solutions, oil-in-water emulsions and water-in-oil emulsions may be made using a variety of hydrocarbons or petroleum products such as kerosene, mineral oil, naphthas, gas oils, crude oils, light distillates, etc. In most instances the hydrocarbon oil carrier for the herbicide is itself phytotoxic.

The herbicides here may be employed along with a number of known herbicides including substituted uracils as 5-bromo-3-secbutyl-methyl uracil; aryl, alkyl urea herbicides as 1-phenyl-3-methyl urea; acidic herbicides such as 2,4-dichlorophenoxy acetic acid and 4-chlorophenoxy acetic acid; substituted picolinic acids as 4-amino-3,5,6-trichloropicolinic acid; salts, esters, amides of the above herbicidal acids or others; maleic hydrazide and its herbicidal derivatives; sulfamic acid and its salts; alkaline salts of cyanic acids; sodium borates; sodium cyanamide; phenyl mercury salts; dinitrophenols and their salts; amine-substituted s-triazines; and boron trifluoride amine complexes. Various combinations of the just-mentioned herbicides and others may also be employed in conjunctive use with the new class of herbicides discovered here.

What is claimed is:

1. A compound of the formula:

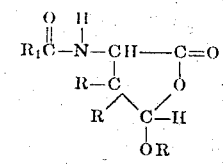

where R is a lower alkyl and R$_1$ is phenyl.

2. 4-Hydroxy-4-methoxy-2-benzamido-3,3-dimethylbutyric acid, γ-lactone.

* * * * *